United States Patent [19]

Bertetti

[11] Patent Number: 5,782,566
[45] Date of Patent: Jul. 21, 1998

[54] METHOD OF ASSEMBLING A VEHICLE WHEEL HUB BEARING TO A RESPECTIVE UPRIGHT, AND BEARING-UPRIGHT UNIT SO FORMED

[75] Inventor: Paolo Bertetti, Turin, Italy

[73] Assignee: SKF Industrie S.p.A., Turin, Italy

[21] Appl. No.: 813,654

[22] Filed: Mar. 7, 1997

[30] Foreign Application Priority Data

Mar. 8, 1996 [IT] Italy .................. TO96A0175

[51] Int. Cl.$^6$ .................................................. F16C 19/08
[52] U.S. Cl. ........................ 384/537; 384/544; 384/625
[58] Field of Search ................................ 384/537, 544, 384/625, 585, 584, 589

[56] References Cited

U.S. PATENT DOCUMENTS 4,990,000  2/1991  Harsdorff ............................ 384/544
5,240,333  8/1993  Hassiotis et al. ...................... 384/537
5,536,075  7/1996  Bertetti ............................... 384/537

Primary Examiner—Lenard A. Footland
Attorney, Agent, or Firm—Burns, Doane, Swecker & Mathis, L.L.P.

[57] ABSTRACT

A bearing-upright unit supporting a rotary hub of a vehicle wheel, wherein the bearing has the inner ring fitted to the rotary hub of the wheel, and the outer ring locked stably to the upright; and the outer ring has an asymmetrical tubular projection extending from only one side of the outer ring, and which is interference-fitted to the upright and locked axially by cold rolling the outer edge of the projection. Advantages: assembly is simplified by involving fewer operations; the outer ring is of simple design, small size, and cheap to produce; the upright may be of simpler design, lighter in weight, and therefore cheaper to produce; and, in the case of an aluminium upright, the outer ring remains safely and firmly locked to the upright at high temperature, by virtue of the greater axial expansion of the upright with respect to the outer ring compensating for any reduction in radial interference.

5 Claims, 1 Drawing Sheet

METHOD OF ASSEMBLING A VEHICLE WHEEL HUB BEARING TO A RESPECTIVE UPRIGHT, AND BEARING-UPRIGHT UNIT SO FORMED

BACKGROUND OF THE INVENTION

The present invention relates to a method of assembling a vehicle wheel hub bearing to a respective upright, and to the bearing-upright unit so formed, and more specifically to a method of assembling the fixed outer ring of the hub bearing inside a seat on the upright.

Numerous methods are currently employed to assemble the outer ring of a hub bearing to a respective upright. According to one known method, the outer ring of the bearing is made integral with the upright by force fitting it inside a seat on the upright, and is locked axially by a shoulder and a retaining ring, or by two retaining rings on either side of the outer ring.

Such a method involves several drawbacks, such as increased deformation of the outer ring of the bearing, due to roundness defects resulting from fitment inside an asymmetrically rigid seat, and to in-service deformation of the upright, which in turn result in deformation of the outer ring tracks, increased noise level, and reduced working life. Moreover, such a method is unsuitable when working with light-alloy uprights, on account of the different thermal expansion coefficients of the materials, which prevent the outer ring of the bearing from being locked firmly and effectively to the upright.

Another method is to fit the fixed outer ring of the bearing to the upright by means of axial screws, for which purpose, the outer ring comprises an outer radial flange in which are formed the holes by which to screw the ring to the upright. Though involving none of the drawbacks typically associated with the first method described above, this method is more expensive by requiring more complex machining of the upright and outer ring, to which must be added the cost of the screws and torquing fixtures.

SUMMARY OF THE INVENTION

It is an object of the present invention to provide a method of assembling the outer ring of a vehicle wheel bearing to a respective upright, designed to overcome the drawbacks of known methods, and which provides for straightforward, reliable, low-cost assembly of the outer ring of the bearing to the upright.

It is a further object of the present invention to provide a bearing-upright unit for supporting a rotary hub of a vehicle wheel and obtained using the above method.

According to the present invention, there is provided a method of assembling a bearing of a vehicle wheel hub to a respective upright, and comprising the steps of:

a) forming the outer ring of the bearing with an asymmetrical tubular projection extending axially from only one side of the outer ring, so worked as to obtain an outer cylindrical seat, and of an axial width greater than the width of the upright, and with an axial shoulder adjacent to the outer ring; the cylindrical seat being inserted with radial interference inside a corresponding seat on the upright;

b) forcing the outer ring, so formed, inside the corresponding seat on the upright until contact is made with the shoulder, and so that an end portion of the tubular projection is left projecting beyond the edge of the upright on the opposite side to the outer ring;

c) cold deforming the end portion to bend the end portion radially on to a flat lateral surface of the upright and axially compress the upright between the shoulder and the bent portion.

According to the present invention, there is also provided a bearing-upright unit supporting a rotary hub of a vehicle wheel, formed according to the assembly method defined above, and wherein a fixed first ring of the bearing is fitted integrally to the upright, and a rotary second ring of the bearing supports the hub; characterized in that the first ring comprises an asymmetrical tubular projection extending axially from only one side of the first ring, and of an axial width greater than the width of the upright; the tubular projection having an outer cylindrical seat, which is interference-fitted inside a seat on the upright, and an axial shoulder adjacent to the first ring; and the tubular projection comprising an end portion projecting beyond the upright, and which is bent radially, by means of a cold permanent deformation operation, on to a flat lateral surface of the upright to lock the first ring to the upright and compress the upright between the shoulder and the bent end portion.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
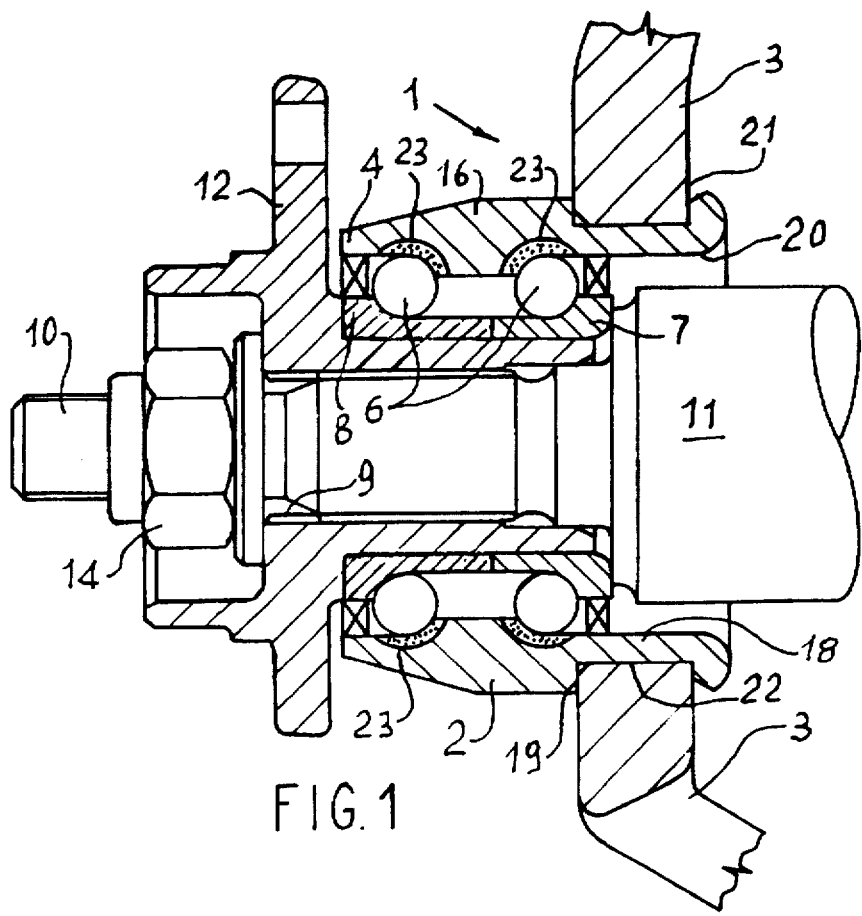
FIG. 1 shows a section of a bearing-upright unit assembled using the method according to the present invention.

Number 1 in FIG. 1 indicates a bearing 2-upright 3 unit assembled using the method according to the present invention. Bearing 2 comprises an outer ring 4 having, in the example shown, two circular tracks 5 (FIG. 2) for two opposite sets of balls 6, but may equally comprise other equivalent types of bearing, e.g. with two sets of rollers.

Balls 6 of bearing 2 support in rotary manner inner rings 7 and 8, which are fitted to a flanged hub 12 connected by a splined shaft 9 to the axle of a constant-velocity universal joint (not shown) to transmit a drive torque to a vehicle wheel (not shown) fitted to the flange of hub 12. Hub 12 is fitted to inner rings 7 and 8 by a nut 14 screwed on to a threaded end 10, and which locks rings 7 and 8 between the shoulders of the hub and the constant-velocity universal joint, i.e. axle 11. According to a variation not shown for the sake of simplicity, ring 8 may be integrated in one piece with flanged hub 12.

Outer ring 4 comprises a main annular body 16 having tracks 5, and in turn comprising an asymmetrical tubular projection 18 extending from one side only, and formed in one piece with annular body 16 with an axial shoulder 19 in between. The axial width of tubular projection 18 is greater than the width of upright 3, so that an end portion or edge 20 projects beyond upright 3.

Tubular projection 18 is worked externally to form, as of shoulder 19, a cylindrical seat 22, which is interference-fitted inside a corresponding seat on upright 3; outer ring 4 is inserted up to shoulder 19; and, by means of a cold rolling permanent deformation operation, edge 20 is bent and pressed tightly and radially on to upright 3, which has a flat lateral surface 21 defining a continuous, even gripping portion between bent edge 20 and upright 3.

The rolling operation presses edge 20 down firmly to exert axial pressure on the upright, which, combined with the radial stress produced by interference-fitting tubular projection 18 to the upright, provides for better, more stable grip.

To roll ring 4 more easily, only small portions 23 surrounding tracks 5 are induction hardened.

Figure 2:
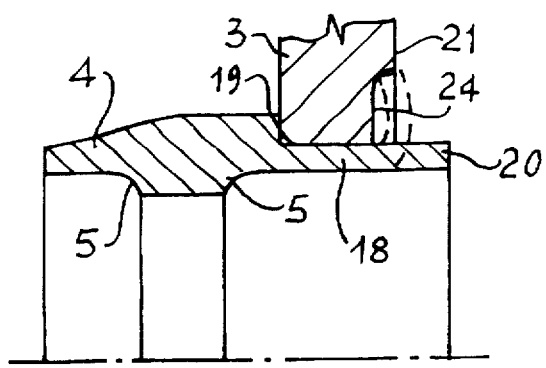
FIG. 2 shows a construction detail of the FIG. 1 upright for better locking the bearing.

FIG. 2 shows a variation of lateral surface 21 of upright 3, for improving the grip of edge 20 and preventing rotation between outer ring 4 and upright 3. In this case, lateral surface 21 comprises a number of radial grooves or recesses 24, which are engaged by the material of bent edge 20.

Figure 3:
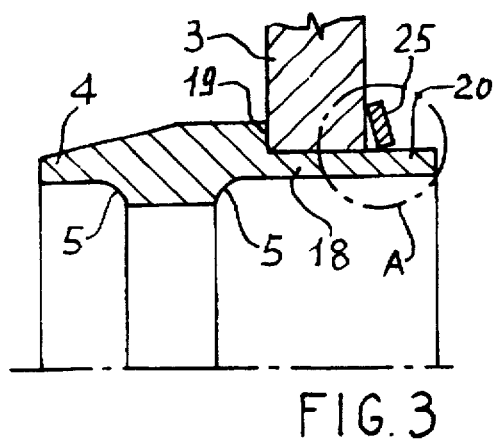
FIG. 3 shows a variation of the FIG. 2 detail.
Figure 4:
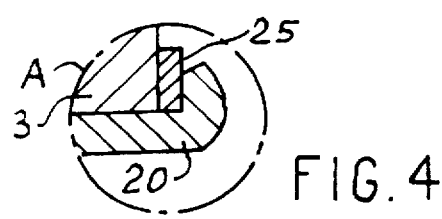
FIG. 4 shows an enlarged detail (A) of FIG. 3.

Another solution, to increase the axial preload on upright 3 and to better distribute over a larger area the pressure generated when rolling edge 20, is to assemble a cup washer 25 (FIGS. 3 and 4) on the portion of tubular projection 18 projecting beyond the upright. When rolled, edge 20 grips and flattens washer 25 against the upright, and the radial stress so generated in the washer press it firmly against both ring 4 and upright 3.

The assembly method according to the present invention is particularly suitable for use with light-alloy uprights, which, alongside an increase in temperature, are subject to greater radial and axial expansion with respect to the outer ring of the bearing, so that any reduction in the radial tension due to the interference fit is compensated by greater axial stress, which ensures adequate stability of the connection.

The above behaviour of the bearing-upright connection enables the use of lighter light-alloy uprights of simpler design as compared with those currently employed, thus affording considerable advantages in terms of weight and cost.

I claim:

1. A bearing-upright unit for a vehicle wheel, wherein a fixed first ring (4) of said bearing is fitted integrally to an upright (3) of a wheel hub (12), and at least one rotary second ring (7, 8) of said bearing supports said hub (12); characterized in that said first ring (4) comprises an asymmetrical tubular projection (18) extending axially from only one side of said first ring, and of an axial width greater than the width of said upright; said tubular projection having an outer cylindrical seat (22), which is interference-fitted inside a seat on said upright, and an axial shoulder (19) adjacent to said first ring; and said tubular projection comprising an end portion (20) projecting beyond said upright, and which is bent radially, by means of a cold permanent deformation operation, on to a lateral surface (21) of said upright to lock said first ring (4) to said upright (3).

2. A bearing-upright unit as claimed in claim 1, characterized in that said cold permanent deformation operation comprises a rolling operation to lock said first ring (4) to said upright (3) and compress said upright between said shoulder and said bent end portion.

3. A bearing-upright unit as claimed in claim 1, characterized in that said lateral surface (21) is flat, and comprises a number of radial grooves (24), which are engaged by said bent end portion.

4. A bearing-upright unit as claimed in claim 1, characterized in that said first ring comprises at least one track (5) induction hardened locally.

5. A bearing-upright unit as claimed in claim 1, characterized in that an elastic cup washer (25) is fitted to said projecting end portion (20) and compressed between said bent end portion and said flat lateral surface of the upright to increase the axial grip of the upright between said shoulder (19) and said bent end portion (20).

* * * * *